Sept. 19, 1939.　　　C. F. BIERBACH　　　2,173,512
DIRECTION INDICATING DEVICE FOR MOTOR VEHICLES
Filed April 21, 1937　　　3 Sheets-Sheet 1
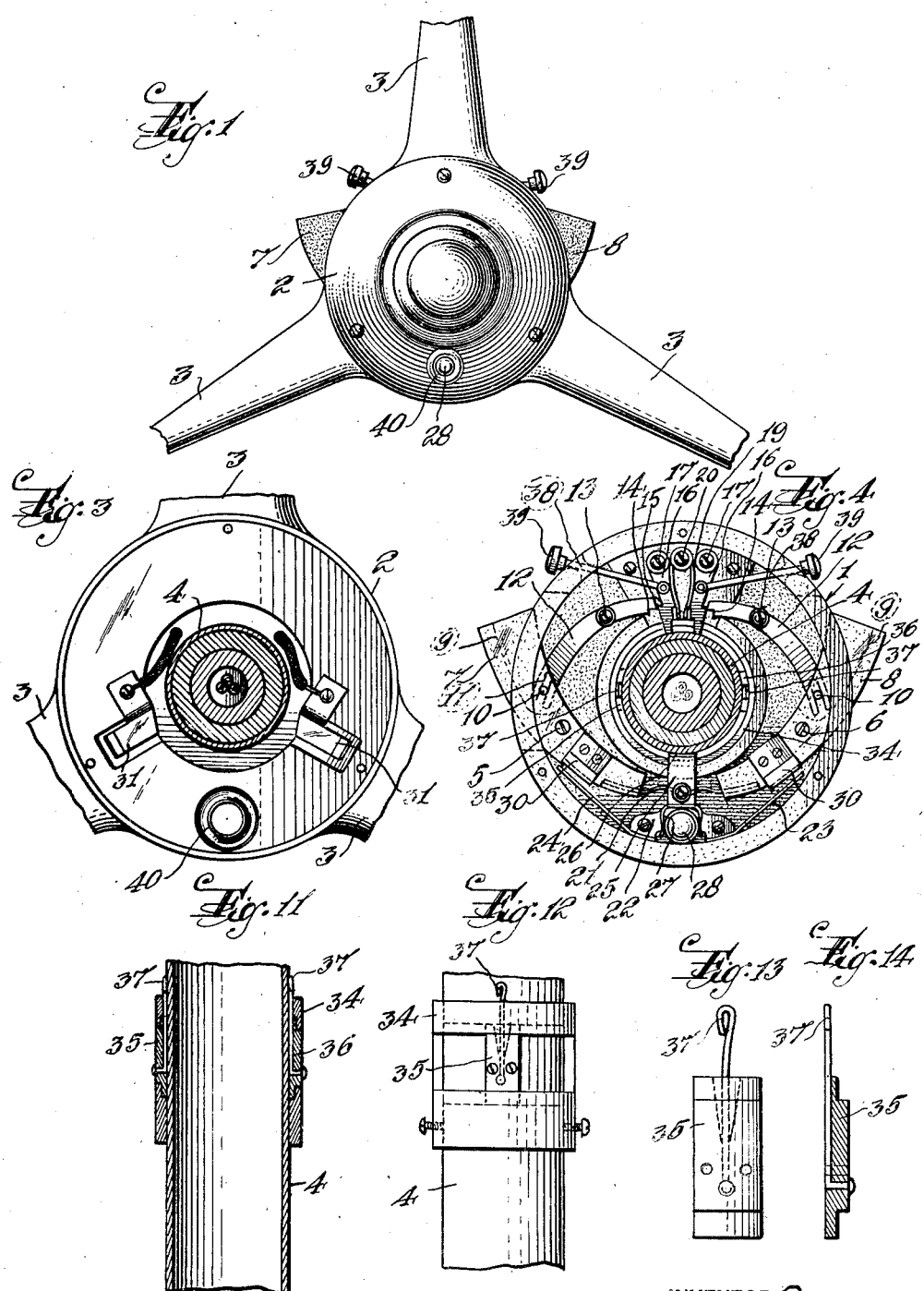
INVENTOR
Carl F. Bierbach,
BY Frank C. Fischer
ATTORNEY

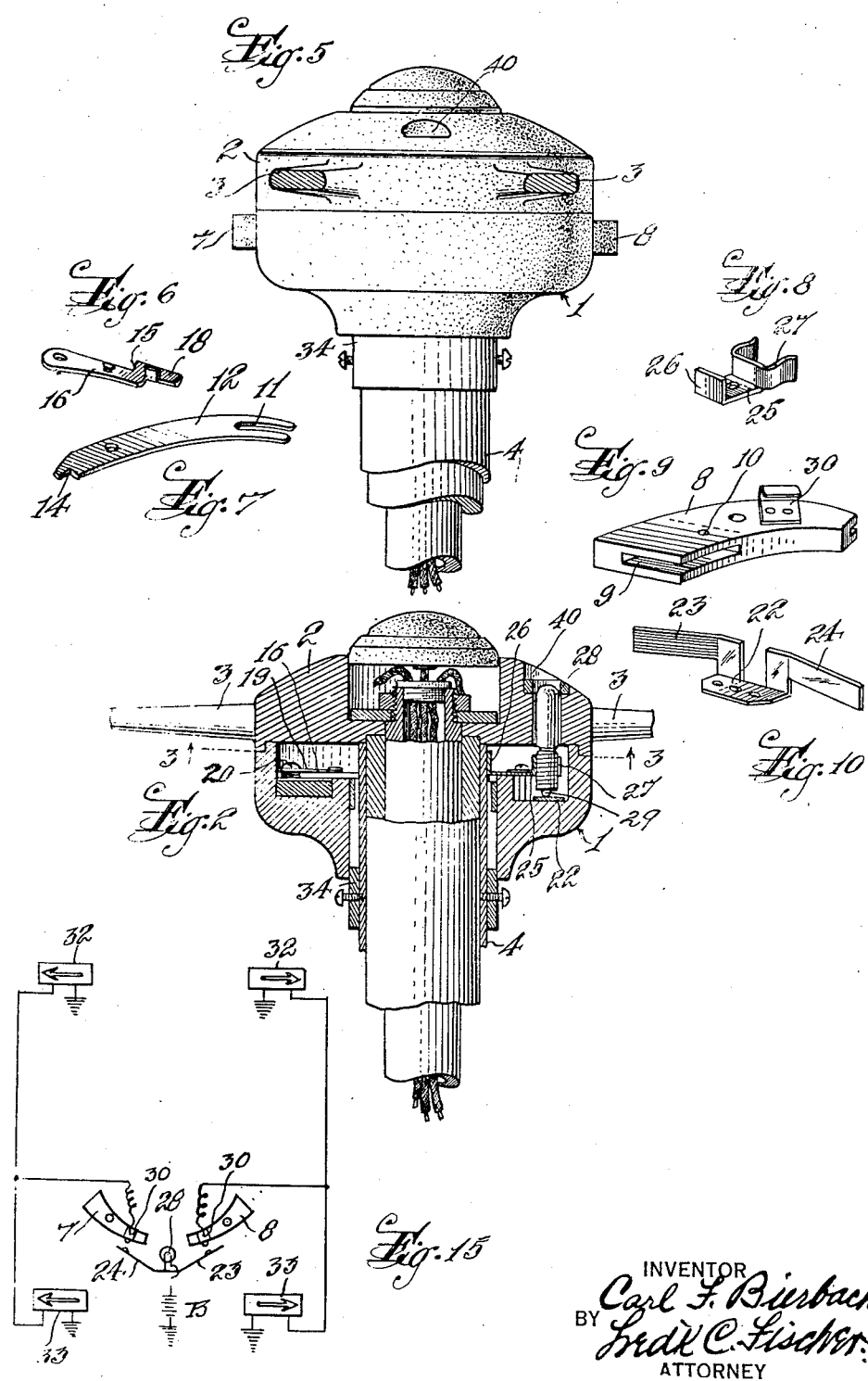

Sept. 19, 1939.  C. F. BIERBACH  2,173,512
DIRECTION INDICATING DEVICE FOR MOTOR VEHICLES
Filed April 21, 1937  3 Sheets-Sheet 3
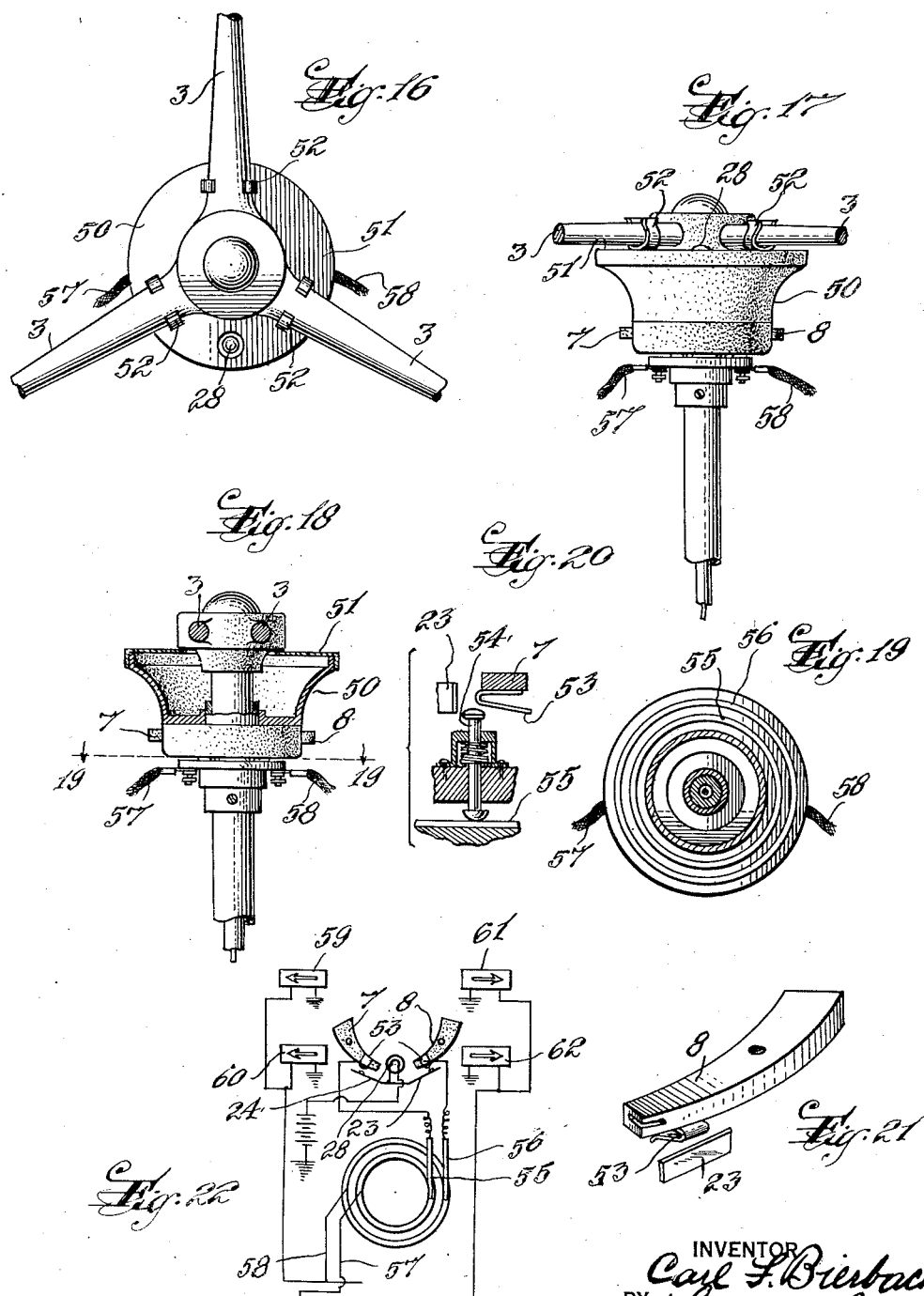

Patented Sept. 19, 1939

2,173,512

UNITED STATES PATENT OFFICE 2,173,512

DIRECTION INDICATING DEVICE FOR MOTOR VEHICLES

Carl F. Bierbach, Newark, N. J., assignor, by direct and mesne assignments, to A. D. S. Corp., a corporation of New Jersey Application April 21, 1937, Serial No. 138,079

2 Claims. (Cl. 200—59)

This invention relates to signalling devices for motor vehicles, and more particularly to improvements in devices for indicating the direction in which the motor vehicle is to be turned.

The present day tendency towards the use of closed automobiles renders it difficult and inconvenient for the driver of such a motor vehicle to indicate to drivers of following and approaching vehicles the direction in which the vehicle is to be turned. This is especially true in the winter time when it is necessary to keep the windows closed. Also, trucks are now built of such a size that it is impractical for the driver to extend his hand beyond the side walls of the truck to indicate a turn.

It is, therefore, an object of this invention to provide a device positioned on the steering post adjacent the steering wheel within easy reach of the driver of the motor vehicle, for indicating the direction in which the vehicle is to be turned. The device is preferably mounted on the steering post beneath the steering wheel, and provided with finger pieces which can be readily and conveniently manipulated by the fingers of the driver without necessitating the removal of the hands from the steering wheel.

A further object is the provision of a direction indicating device for motor vehicles, which device is simple in structure and positive in operation, and will not readily get out of order no matter how frequently it may be used.

A further object is the provision in a direction indicating device for motor vehicles, of means for automatically returning the parts of the device to a neutral position after the motor vehicle has made a desired turn indicated by the device.

A further object is the provision of a direction indicating device which can be readily and conveniently installed on any type of motor vehicle without material alteration.

These and other advantageous objects, which will later appear are accomplished by the simple and practical construction and arrangement of parts hereinafter described, and exhibited in the accompanying drawings, forming part hereof, and in which:

Fig. 1 is a plan view of the center portion of a steering wheel having my direction indicator mounted thereon, Fig. 2 is a sectional view of the hub of a steering wheel and my indicating device, Fig. 3 is an underside view of a cover plate for the indicating device, as viewed along lines 3—3 of Fig. 2, Fig. 4 is a sectional view of the device looking downward on line 3—3, Fig. 5 is an elevational view showing the device mounted upon a steering post, Figs. 6, 7, 8, 9 and 10 are perspective views of elements employed in the device, Fig. 11 is a sectional view of a steering column having mounted thereon a resetting device for the indicator, Fig. 12 is a side elevational view of the resetting device, Fig. 13 is an elevational view of an element of the resetting device, Fig. 14 is a side view of the element shown in Fig. 13, Fig. 15 is a wiring diagram of the electrical circuit employed in the indicating device, Fig. 16 is a plan view of a modified form of the indicating device, Fig. 17 is a side elevational view of the modified form, Fig. 18 is a sectional view of the modified form, Fig. 19 is a sectional view taken on line 19—19 of Fig. 18, Fig. 20 is an elevational view partly in section of contact elements employed in the modified form, Fig. 21 is a perspective view of an element used in the modified form, and Fig. 22 is a wiring diagram of electrical circuit employed in the modified form of the invention.

Referring to the drawings, in Fig. 2 the indicating device is shown to comprise a casing 1 which is attached to the underside of the hub 2 of a steering wheel having spokes 3. The casing 1 encircles a steering column 4. Pivotally mounted at 5 and 6 and diametrically arranged in the casing are levers 7 and 8, made of an insulating material, a portion of the levers extending beyond the outer wall of the casing. Each lever is provided with a slot 9 which is traversed by a pin 10, positioned in a slot 11 of a lever 12, pivoted at 13. Each of the levers 12 has one end thereof provided with a notch 14 adapted to rest upon a shoulder 15 of an arm 16, pivoted at 17 and having an inclined face 18. The arms 16 are normally urged outwardly from each other by a bowed spring 19 secured to the casing at 20.

The levers 7 and 8 have one end thereof receiving the ends of a spring 21 which normally tends to rotate levers 7 and 8 to cause them to project beyond the walls of the casing. Attached to the casing between the lower ends of levers 7 and 8, (see Fig. 4) is a contact member 22 having arms 23 and 24.

Attached to the casing between the lower ends of levers 7 and 8 is a contact member 25 having an upturned flange 26 at one end thereof and the other end thereof formed into a resilient bowed brace 27 adapted to hold and contact the metallic screw-threaded portion of a small incandescent lamp 28, the circuit through the filament of the lamp being completed by engagement of the tip 29 of the lamp with the contact member 22.

Each of the levers 7 and 8 is provided with a resilient metal contacting member 30, which, when either of the levers 7 and 8 are moved inwardly, contact one of the arms 23 or 24, and at the same time engages a metal contact member 31 (see Fig. 3) mounted on the underside of the hub 2, from which a conducting wire is led to indicating signals 32 and 33 as shown in the wiring diagram of Fig. 15.

In operation, when it is desired to indicate a left turn, the lever 7 is pressed inwardly which causes notch 14 of lever 12 to snap over the shoulder 15, of the adjacent arms 16 against the resistance of spring 19. The lever will be held in this position by the latching action caused by the notch 14 and shoulder 15.

At the same time, the contact member 30 will engage the arm 24 and the contact member 31, thus completing an electric circuit through indicators 32 and 33 and the incandescent lamp to the contact member 25, the flange 26 of which engages a steering column 4 which is connected to the battery B as indicated in the wiring diagram in Fig. 15.

The same operation will take place should it be desired to indicate a right turn, in which case the lever 8 would be pressed inwardly.

Mounted on the steering column 4 adjacent the free ends of levers 12 is a collar 34 to which is attached a pair of wire members 35 and 36 having rounded ends 37 projecting upwardly to a position to engage the free ends of levers 12. When lever 7 has been pressed inwardly to indicate a left turn, the lever 12 will be latched to the arm 16 by means of the notch 14 and shoulder 15 as above described. As the turn is being made, the steering wheel rotates carrying with it the casing. However, the steering column remains stationary and as the steering wheel is rotated, the tip or free end of arm 16 will engage the rounded portion 37 of the wire member 35 to disengage the shoulder 15 from the notch 14, thus releasing lever 7 so that it can be returned by the action of spring 21 to a position for again indicating a left turn if desired.

In some cases lever 7 is pressed inwardly to indicate a left turn and the driver changes his mind and does not make the turn. In such circumstances, the indicators 32 and 33 would continually indicate that the driver intended to make a left turn. In order to reset lever 7 under such conditions, there is attached to arm 16 a small rod 38 having a finger piece 39, which when pressed inwardly disengages shoulder 15 from notch 14 and allows lever 7 to be reset.

The hub of the steering wheel is provided with a recess 40 in which the incandescent lamp 28 projects so that when a circuit is completed through the lamp by pressing inwardly either levers 7 and 8, the lamp will produce a visible signal assuring the driver that the indicators 32 and 33 are in operation.

In Figs. 16 to 22 there is shown a modified form of the invention in which a casing 50 is provided with a cover 51 having resilient clips 52 on the upper side thereof, by means of which the casing can be readily attached to the spokes of the steering wheel as shown in Figs. 16 and 17.

The casing 50 has mounted therein levers 7 and 8 and the mechanism as above described with the exception that the levers 7 and 8 have mounted on the under side thereof contact members 53 which simultaneously engage either of contact arms 23 and 24, and a pin 54 which rides over contact rings 55, and 56 (see Fig. 19) which rings are connected by means of wires 57 and 58 respectively, to indicators 59, 60, and 61, 62.

In the modified form the device is provided with resetting members of the same type as shown in Figs. 11, 12, 13 and 14.

The modified form shown in Figs. 16 to 21 presents a simple and more convenient means of attachment to a steering wheel and steering column; otherwise they are substantially the same structures as described in connection with the form shown in Figs. 1 to 15.

From the above description it will be seen that I have provided a simple and positive operating device for indicating the direction in which a motor vehicle is being turned. The device obviously is so arranged that it will not get out of order and will always be in condition for positive operation. The operator is at all times assured of the form of the operative condition of the indicating device by the small incandescent lamp which is included in the circuit to the indicator.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, what I claim as new and desire to secure by Letters Patent, is:

1. In a switch device, a casing adapted to be attached to the hub of a steering wheel of a motor vehicle, a first pair of levers pivotally mounted in the casing, a second pair of levers pivotally mounted in the casing and engaging said first pair of levers, spring means tending normally to cause portions of said second pair of levers to project outside of the casing, contact means on said second pair of levers for closing an electrical circuit when the projecting portions of said second pair of levers are moved into the casing, and detent means associated with the first pair of levers for retaining the second pair of levers in circuit closing position.

2. In a switch device, a casing adapted to be attached to a steering wheel of a motor vehicle, a first lever pivotally mounted in the casing, a second lever pivotally mounted in the casing and engaging said first lever, means tending to normally cause a portion of said second lever to project outside of the casing, contact means mounted on said second lever to close an electrical circuit when said second lever is moved into the casing, a detent associated with said first lever to hold the second lever in a circuit closing position when it is moved into the casing, and means mounted on the steering post for the steering wheel projecting into the casing adjacent the detent to release the detent when the steering wheel has been turned through a predetermined angle.

CARL F. BIERBACH.